United States Patent [19]

Coop, Sr.

[11] 4,079,487

[45] Mar. 21, 1978

[54] CLAMP ASSEMBLY WITH LOCKING FEATURE

[76] Inventor: Jeffrey W. Coop, Sr., 12924 Lakeland Rd., Santa Fe Springs, Calif. 90670

[21] Appl. No.: 749,320

[22] Filed: Dec. 10, 1976

[51] Int. Cl.² .................................... F16L 33/10
[52] U.S. Cl. .................................. 24/277; 151/20
[58] Field of Search ............... 24/277, 276, 135 M, 24/284, 279, 286, 275; 151/20; 285/199

[56] References Cited

U.S. PATENT DOCUMENTS

| 1,233,366 | 7/1917 | Keator | 24/135 M |
| 1,855,620 | 4/1932 | Wilkins | 24/135 M |
| 3,409,259 | 11/1968 | Cross | 24/277 |
| 3,633,254 | 1/1972 | Hoglund | 24/276 |
| 3,727,266 | 4/1973 | Ashworth | 24/277 |
| 3,877,502 | 4/1975 | Hunckler | 24/277 |
| 3,919,747 | 11/1975 | Offterdinger | 24/277 |

FOREIGN PATENT DOCUMENTS

| 1,401,468 | 4/1965 | France | 24/284 |
| 166,572 | 7/1906 | Germany | 151/20 |

*Primary Examiner*—Bernard A. Gelak
*Attorney, Agent, or Firm*—J. C. Baisch

[57] ABSTRACT

A muffler saddle clamp having a nut-locking action by using the flat of a standard finished hex-nut against a stop formed on the base of saddle clamps.

2 Claims, 7 Drawing Figures

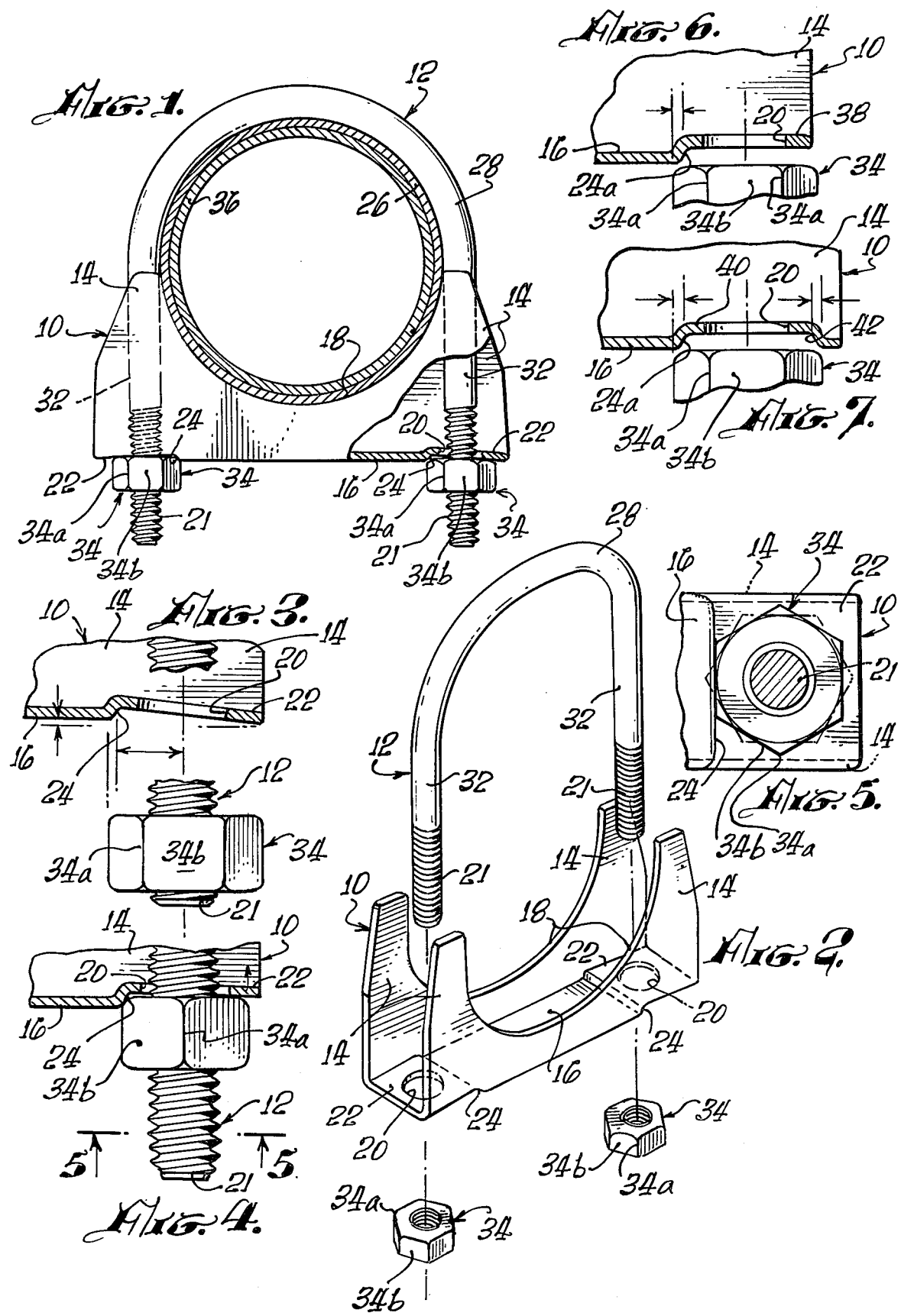

CLAMP ASSEMBLY WITH LOCKING FEATURE

BACKGROUND OF THE INVENTION

1. Field of the Invention

This invention relates to means for self-locking nuts on threaded bolts of saddle clamp assemblies and the like.

2. Description of the Prior Art

There are various known types of self-locking threaded assemblies, but these have certain disadvantages. Some of these arrangements rely on hardened spring steel, special lock-nuts, or special bolts, all of which are relatively expensive. Further, where the component parts are subjected to heat, it is undesirable to use hardened steel washers and the like because they loose their temper or fracture. Another disadvantage of prior art arrangements is that the nuts will exert considerable friction when rotated on the threads, and this requires tools for assembling or disassembling.

SUMMARY OF THE INVENTION

According to a typical embodiment of the invention, there is a muffler saddle clamp and a U-bolt having arms which extend through openings provided therefore in the flat, closed, end part or base of the clamp. The flat end part or base of the clamp is deformed to provide a shoulder extending transversely of said end part or base, there being a shoulder adjacent each of the openings through which the threaded ends of the U-bolt extend. A standard finished hex-nut is disposed on each of the threaded ends of the U-bolt extend. A standard finished hex-nut is disposed on each of the threaded ends of the U-bolt and the respective shoulders are spaced from the adjacent threaded end of the U-bolt the distance of the thickness of the nut from the inside to the thinnest parts or flat sides of the nut. In tightening the assembly to an exhaust pipe, the nuts on the U-bolt are tightened and the corners of the nut will initially slip past the shoulder and allow the nut to be seated on the adjacent surface of the end part of the clamp with one of the outer flat sides of the nut in abuttment against the adjacent shoulder.

OBJECTS AND ADVANTAGES OF THE INVENTION

It is an object of the present invention to provide a muffler saddle clamp assembly having self-locking means for locking the nuts on the U-bolt of the device.

It is another object of the invention to provide an assembly of this character wherein the base of the saddle clamp has openings for the threaded ends of the U-bolt and at least one shoulder adjacent each opening against which one flat side of a hex-nut engages when the nut is forced against said base.

It is still another object of the invention to provide a device of this character wherein standard finished hex-nuts are used for the respective ends of the U-bolt.

It is a further object of the invention to provide a device of this character wherein the nuts will turn freely on the threaded ends of the U-bolt until it contacts the saddle clamp base.

It is a still further object of the invention to provide a device of this character wherein the base of the saddle clamp is deformed with a part adjacent the shoulder which is inclined toward said shoulder.

It is another object of the invention to provide a device of this character that is simple in construction and operation.

It is still another object of the invention to provide a device of this character that is relatively inexpensive to manufacture.

The characteristics and advantages of the invention are further sufficiently referred to in connection with the following detailed description of the accompanying drawings which represent certain embodiments. After considering these examples, skilled persons will understand that many variations may be made without departing from the principles disclosed and I contemplate the employment of any structures, arrangements or modes of operation that are properly within the scope of the appended claims.

BRIEF DESCRIPTION OF THE DRAWINGS

Referring to the drawings, which are for illustrative purposes only:

FIG. 1 is a side elevational view of a clamp assembly embodying the present invention, a portion being broken away;

FIG. 2 is an exploded, perspective view thereof;

FIG. 3 is a fragmentary, enlarged, sectional view showing the threaded portion of one arm of the U-bolt and the deformed end of the base of the saddle clamp, the nut being partly threaded onto said threaded arm;

FIG. 4 is a similar view showing the nut seated on said deformed part of the saddle clamp base;

FIG. 5 is a view taken on line 5—5 of FIG. 4;

FIG. 6 is a fragmentary, sectional view of an alternative arrangement; and

FIG. 7 is a fragmentary, sectional view of another alternative arrangement.

DESCRIPTION OF THE PREFERRED EMBODIMENTS

Referring to FIGS. 1 to 5 inclusive, there is shown one embodiment of the invention. In this embodiment, the muffler saddle clamp assembly includes a saddle clamp, indicated generally at 10 and a U-bolt, indicated generally at 12.

The saddle clamp 10 is formed from mild steel plate and is generally U-shaped in cross-section. It comprises arms 14 which are substantially parallel to each other and spaced apart with a base 16 connecting the arms together. Arms 14 are formed with arcuate notches 18 from their free ends, said notches being of the same size.

The base 16 of the saddle clamp has openings or holes 20 adjacent the ends thereof for reception of threaded free end portions 21 of the U-bolt 12. Each end of the base has a deformed portion 22 best shown in FIGS. 1, 2 and 3. Each deformed portion includes one of the openings or holes 20 and is inclined from adjacent free end of the base 16 inwardly and terminates in a transverse shoulder 24.

As best shown in FIG. 1, the saddle clamp arms receive a semi-circular part of a pipe 26 and the curved, closed portion 28 of the U-bolt extends about the other semicircular portion of the pipe 26 with the threaded free end portions 21 of the arms 32 extending through the openings 20 of the base of the clamp 10. A hex-nut, indicated generally at 34 is threaded onto the threaded end portions 21 of the U-bolt and said nuts are turned down until they engage the shoulder 24. Since the outer end of the deformed portion 22 is slightly spaced upwardly of the outer surface of the base, as best shown in FIG. 3, rotation of the nut with a wrench will first cause points 34a of the exterior of the nut to first engage the free outer edge of the shoulder, as best shown in FIGS.

1 and 4, and it is to be noted that up to this point, the nut turns freely on the threaded end of the "U" bolt. Further turning of the nut with the wrench, will cause the nut to be forced against the shoulder and the outer end of the deformed part 22, and tightening of the nut will force the inclined part 22 into flattened, parallel relationship to the plane of the outer surface of the base 16, as best shown in FIG. 4. When thus tightened, one of the flat sides 34b of the nut engages the shoulder 24. Thus, the nuts are securely locked in the tightened positions.

In use, a free end portion of an exhaust pipe 36 is inserted into one end of the pipe 26 and a free end portion of a muffler pipe is also inserted into the opposite end of pipe 26. The nuts 34 are then tightened to secure the pipe together in the usual well known manner.

Referring to FIG. 6, there is shown an alternative arrangement, wherein the base 16 of the saddle clamp is deformed as at 38, the part 38 is off-set from the main portion of the base 16 and in a plane parallel thereto.

The sequence of operation in this embodiment is substantially the same as that described in connection with the embodiment of FIGS. 1 through 5, except that, as the nut 34 is tightened its corners 34a will engage the shoulder 24a. As the nut is further tightened, it will seat flat in the part 38 with one of the sides 34b of the nut engaging the shoulder 24a.

In FIG. 7 there is disclosed another alternative arrangement wherein the ends of the base 16 of the clamp are off-set to provide parts 40 which are in planes off-set from the main portion of the base 16 and in a plane parallel thereto. In this arrangement there is an outer shoulder 42 similar to the shoulder 24a but oppositely arranged. In this arrangement, as the nut 34 is tightened, the external points 34a of the nut 34 engage the shoulders 24a and 42. As the nut is further tightened, it will seat flatly on the part 40 with opposite flat sides in engagement with said shoulders.

In these various embodiments, where the nut is fully tightened, it is held against unscrewing by the engagement of the flat sides 34b of the nuts with the shoulders.

While a hex-nut is shown and described it is to be understood that nuts having a different number of flat exterior sides may be used.

The invention and its attendant advantages will be understood from the foregoing description, and it will be apparent that various changes may be made in the form, construction and arrangement of the parts of the invention without departing from the spirit or scope thereof or sacrificing its material advantages, the arrangement hereinbefore described being merely by way of example, and I do not wish to be restricted to the specific form shown or uses mentioned except as defined in the accompanying claims.

I claim:

1. A muffler saddle clamp assembly comprising:

a saddle clamp U-shaped in cross-section having a pair of laterally spaced arms with arcuate aligned notches, said arms being connected together by a base;

said base having deformed end portions having bolt holes therein;

transverse shoulders at the inner ends of said deformed portions;

and wherein there is included a U-bolt having threaded free ends, and nuts having a plurality of exterior sides and points therebetween, said nuts being for threadable reception on said threaded ends, the points of said nuts being adapted to initially engage the shoulders as said nuts are tightened and when fully tightened, a flat side of the nuts engage respective shoulders.

2. The invention defined by claim 1, including a U-bolt having threaded end portions extending through the bolt holes; said nuts being hex nuts threadably disposed on said threaded end portions, the points of said nuts initially engage the shoulders when the nuts are rotated in the tightening direction and when said nuts are fully tightened and seated on said deformed end portions, a flat side of the nuts are in engagement with the respective shoulders.

* * * * *